United States Patent Office 3,415,820
Patented Dec. 10, 1968

3,415,820
2',2'-DIFLUORO-2',3'-DIHYDROFURAN DERIVATIVES OF THE ANDROSTANE AND 19-NOR-ANDROSTANE SERIES
John H. Fried, Palo Alto, Calif., assignor to Syntex Corporation, Panama, Panama, a corporation of Panama
No Drawing. Filed Aug. 5, 1966, Ser. No. 570,422
23 Claims. (Cl. 260—239.55)

This invention relates to novel cyclopentanophenanthrene derivatives.

More particularly, the present invention relates to novel 2',2'-difluoro-2',3'-dihydrofuran derivatives of the androstane and 19-nor-androstane series.

The compounds of the present invention are of the formulas

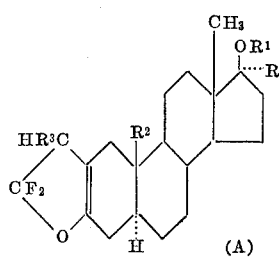

(A)

and

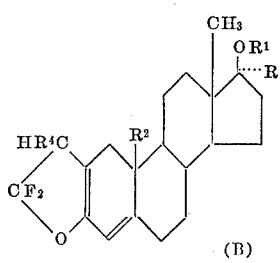

(B)

wherein R represents hydrogen, lower alkyl, lower alkenyl or lower alkenyl, $R^1$ represents hydrogen, a carboxylic acyl group of less than 12 carbon atoms, tetrahydrofuran-2-yl, or tetrahydropyran-2-yl, $R^2$ represents hydrogen or methyl, $R^3$ represents lower alkoxy or a carboxylic acyloxy group of less than 12 carbon atoms, and $R^4$ represents hydrogen, lower alkoxy or a carboxylic acyloxy group of less than 12 carbon atoms.

The expressions lower alkyl, lower alkenyl and lower alkenyl include aliphatic hydrocarbons of up to four carbon atoms such as methyl, ethyl, vinyl, ethenyl, propyl, butyl, propynyl, and the like. The expression lower alkoxy includes methoxy, ethoxy, and the like containing up to four carbon atoms.

The carboxylic acyl and acyloxy groups of the compounds of the present invention contain less than 12 carbon atoms and may be of a straight, branched, cyclic or cyclic-aliphatic chain structure. This structure may be saturated, unsaturated, or aromatic and optionally substituted by functional groups such as hydroxy, alkoxy containing up to 5 carbon atoms, acyloxy containing up to 12 carbon atoms, nitro, amino, halogeno, and the like. Typical esters thus include acetate, propionate, enanthate, benzoate, trimethylacetate, t-butylacetate, phenoxyacetate, cyclopentylpropionate, aminoacetate, β-chloropropionate, adamantoate, and the like.

The compounds of the present invention of Formula A above are prepared from a 2-lower alkoxymethylene- or 2-acyloxy-methylene-androstane or 19-norandrostane as illustrated below.

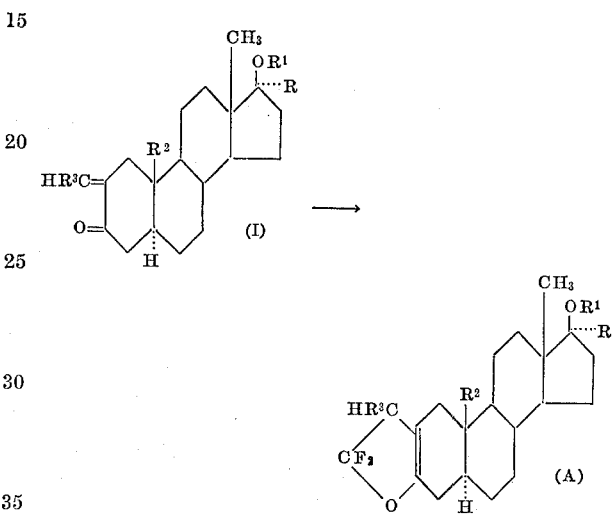

In the above formulas, R, $R^1$, $R^2$ and $R^3$ are as defined hereinabove. In practicing the above illustrated process, the starting material I, a 2-lower alkoxymethylene-3-oxo-5α-androstane, 2-acyloxymethylene-3-oxo-5α-androstane, or the corresponding 19-norandrostanes is reacted with an alkali metal salt of chlorodifluoroacetic acid, e.g. sodium chlorodifluoroacetate in an inert solvent such as dimethyl diethylene glycol ether, dimethyl dipropylene glycol ether, and the like at a temperature of from about 150° C. to about 190° C. to furnish the novel steroid (A). The reaction can be followed by U.V. spectra and generally takes from about 1 to 12 hours or more. The amount of alkali chlorodifluoroacetate employed in the reaction can range from about 10 to 50, or more, molar equivalents, preferably from about 10 to 40. The starting material I can be obtained according to the procedure described in, for example, U.S. Patents 2,908,693, 3,135,743 and 3,145,200. To obtain the 17β-tetrahydrofuran-2-yl ether and 17β-tetrahydropyran-2-yl ether derivatives, etherification of the corresponding 17β-free alcohol can be accomplished either before or after preparation of the compounds of the present invention. The tetrahydrofuranyl and tetrahydropyranyl ethers can be prepared, e.g., by reaction of the 17β-free alcohol with dihydropyran or dihydrofuran in the presence of an acid catalyst such as p-toluenesulfonic acid, p-toluenesulfonyl chloride, and the like. Similarly, esterification at C-17 can be accomplished either before or after preparation of the compounds of the present invention by reaction of the 17β-hydroxy compound with, e.g., a carboxylic acid anhydride in pyridine, or the like.

The compounds of the present invention according to Formula B above are prepared from a 2-methylene-Δ⁴-3-oxo- or 2-substituted methylene-Δ⁴-3-oxo-androstane or 19-norandrostane as illustrated below.

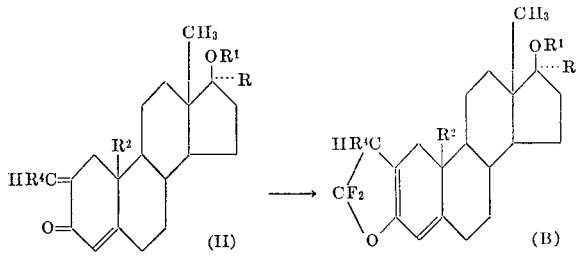

In the above formulas, R, $R^1$, $R^2$ and $R^4$ are as defined above. The conversion of the starting material II into the novel compounds of Formula B is accomplished by treatment with an alkali metal salt of chlorodifluoroacetic acid, e.g., sodium chlorodifluoroacetate in an inert solvent in the same manner as described above in connection with the novel compounds of Formula A. The starting material II can be obtained according to the procedure described in, for example, U.S. Patents 2,908,693, 3,145,200, 3,152,153 and 3,135,743. Etherification or esterification at C-17 can be accomplished either before or after preparation of the compounds of Formula B.

The compounds of the present invention have a useful high anabolic-androgenic ratio and are especially valuable for treatment of those conditions or ailments where an anabolic effect together with a lower androgenic effect is desired such as in geriatrics, tissue build up, and like conditions. The compounds of the present invention or mixtures are administered in conjunction with one or more pharmaceutically acceptable excipients, orally or parenterally at a dosage level of from about 0.5 μg. to 5 mg. per kilogram of body weight per day. Higher or lower doses are also practical, depending on the degree and severity of the condition being treated. For making up a dosage, there can be employed pharmaceutically acceptable excipients such as gelatine, lactose, starches, talc, magnesium stearate, water, polyalkylene glycols, vegetable oils, gums, dextrine, and other known pharmaceutically acceptable carriers. They can also contain auxiliary substances, such as preserving, stabilizing, flavoring, wetting, emulsifying agents, buffers, and the like.

The following detailed examples serve to illustrate but are not intended to limit the scope of the present invention.

EXAMPLE 1

To a gently refluxing and stirred solution of 1 g. of 2-methoxymethylene-17β-5α-androstan-3-one in 8 ml. of dimethyl diethylene glycol ether is added over a two hour period in a dropwise fashion, a solution of 12 molar equivalents of sodium chlorodifluoroacetate in 20 ml. of dimethyl diethylene glycol ether. The mixture is refluxed until the reaction is substantially complete, as determined by observation of the U.V. spectra, and then filtered. The filtrate is evaporated in vacuo and the residue obtained is taken up in methylene chloride: hexane (1:10) and poured onto a 150 g. silica chromatographic column. The chromatographic column is then eluted with hexane containing increasing amounts of methylene chloride. The eluate fractions are freed of solvent and those fractions eluted with 85% and 100% methylene chloride, shown by thin layer chromatography to be about 90% pure, are subjected to recrystallization from acetone:hexane to furnish 5α-androstan-17β-ol-[2,3-d]-2', 2'-difluoro-3'α-methoxy-2, 3'-dihydrofuran and 5α-androstan-17β-ol-[2,3-d]-2', 2'-difluoro-3'β-methoxy-2', 3'-dihydrofuran.

In the same manner, substituting 2-methoxymethylene-17β-hydroxy-5α-androstan-3-one-17-acetate,
2-acetoxymethylene-17β-hydroxy-5α-androstan-3-one-17-acetate,
2-methoxymethylene-17β-hydroxy-17α-ethynyl-5α-androstan-3-one-17-acetate,
2-methoxymethylene-17β-hydroxy-17α-ethynyl-androst-4-en-3-one,
2-methylene-17α-ethynyl-17β-(tetrahydropyran-2'-yloxy)-androst-4-en-3-one,
2-methoxymethylene-17β-hydroxy-19-nor-5α-androstan-3-one,
2-methoxymethylene-17α-ethynyl-17β-hydroxy-19-nor-5α-androstan-3-one,
2-methoxymethylene-17β-hydroxy-17α-methyl-19-nor-5α-androstan-3-one,
2-methoxymethylene-17α-ethynyl-17β-hydroxy-19-norandrost-4-en-3-one,
2-ethoxymethylene-17β-hydroxy-5α-androstan-3-one-17-acetate, and
2-acetoxymethylene-17β-hydroxy-19-norandrost-4-en-3-one for 2-methoxymethylene-17β-hydroxy-5α-androstan-3-one, there is obtained the 3'-isomers of 5α-androstan-17β-acetoxy-[2,3-d]-2',2'-difluoro-3'-acetoxy-2',3'-dihydrofuran,
5α-androstan-17β-acetoxy-17α-ethynyl-[2,3-d]-2',2'-difluoro-3'-methoxy-2',3'-dihydrofuran,
17α-ethynylandrost-4-en-17β-ol-[2,3-d]-2',2'-difluoro-3'-methoxy-2',3'-dihydrofuran,
17α-ethynylandrost-4-en-17β-(tetrahydropyran-2'-yloxy)-[2,3-d]-2',2'-difluoro-2',3'-dihydrofuran,
19-nor-5α-androstan-17β-ol-[2,3-d]-2',2'-difluoro-3'-methoxy-2',3'-dihydrofuran,
17α-ethynyl-19-nor-5α-androstan-17β-ol-[2,3-d]-2',2'-difluoro-3'-methoxy-2',3'-dihydrofuran,
17α-methyl-19-nor-5α-androstan-17β-ol-[2,3-d]-2',2'-difluoro-3'-methoxy-2',3'-dihydrofuran,
17α-ethynyl-19-nor-androst-4-en-17β-ol-[2,3-d]2',2'-difluoro-3'-methoxy-2',3'-dihydrofuran,
5α-androstan-17β-acetoxy-[2,3-d]-2',2'-difluoro-3'-ethoxy-2',3'-dihydrofuran, and
19-nor-androst-4-en-17β-ol-[2,3-d]-2',2'-difluoro-3'-acetoxy-2',3'-dihydrofuran

EXAMPLE 2

To a slurry of 1.0 g. of sodium hydride in 10 ml. of dry diethyleneglycol dimethyl ether under a dry nitrogen atmosphere is slowly added 1.0 g. of 5α-androstan-17β-ol-[2,3-d]-2',2'-difluoro - 3'α - methoxy-2',3'-dihydrofuran in 10 ml. of dry diethyleneglycol dimethyl ether in a dropwise fashion over a 20 minute period. To this mixture is added dropwise, 0.9 g. of 2-chlorotetrahydrofuran over a 10 minute period.

The mixture is stirred at room temperature for an additional 30 minutes and then cautiously added to an ice water mixture with stirring. The organic phase is extracted with diehyl ether, dried and evaporated under reduced pressure to yield 5α-androstan-17β-(tetrahydrofuran-2-yloxy)-[2,3-d]-2', 2'-difluoro-3'α-methoxy-2', 3'-dihydrofuran which may be further purified via crystallization from acetone:hexane.

Similarly, by the use of 2-chlorotetrahydropyran in place of 2-chlorotetrahydrofuran, there is obtained the corresponding 17β-tetrahydropyran-2-yloxy derivative.

In the same manner, by substituting other 17β-free alcohol compounds of the present invention or a mixture of the 3′-isomers which can later be separated, if desired, by chromatography and recrystallization, for 5α-androstan-17β-ol-[2,3-d]-2′, 2′-difluoro-3′α-methoxy-2′, 3′-dihydrofuran, the corresponding 17β-ethers are obtained.

EXAMPLE 3

A mixture of 1 g. of 5α-androstan-17β-ol-[2,3-d]-2′,2′-difluoro-3′α-methoxy-2′,3′-dihydrofuran, 4 ml. of pyridine and 2 ml. of acetic anhydride is allowed to stand at room temperature for 15 hours. The mixture is then poured into ice water and the solid which forms is collected by filtration, washed with water and dried to yield 5α-androstan-17β-acetoxy - [2,3-d] - 2′,2′ - difluoro-3′α-methoxy-2′,3′-dihydrofuran which may be further purified through recrystallization from acetone:hexane.

By the use of other carboxylic acid anhydrides, e.g. propionic anhydride, valeric anhydride, caproic anhydride, and the like in place of acetic anhydride, the corresponding 17β-acylates are obtained.

In the same manner, by substituting 17β-free alcohol compounds of the present invention or a mixture of the 3′-epimers of the compounds of the present invention which can be separated, if desired, after esterification by chromatography and recrystallization as described above, for 5α-androstan - 17β - ol - [2,3-d] - 2′,2′ - difluoro-3′α-methoxy-2′,3′-dihydrofuran, the corresponding 17β-acylates, e.g. the acetates, are obtained.

EXAMPLE 4

Two milliliters of dihydropyran are added to a solution of 1 g. of 5α-androstan-17β-ol-[2,3-d]-2′,2′-difluoro-3′α-methoxy-2′,3′-dihydrofuran in 15 ml. of benzene. About 1 ml. is removed by distillation to remove moisture and 0.4 g. of p-toluenesulfonic acid is added to the cooled solution. This mixture is allowed to stand at room temperature for 4 days, and is then washed with aqueous sodium carbonate solution and water, dried and evaporated. The residue is chromatographed on neutral alumina, eluting with hexane, to yield 5α-androstan-17β-(tetrahydropyran-2-yloxy) - [2,3-d] - 2′,2′ - difluoro-3′α-methoxy-2′,3′-dihydrofuran which is recrystallized from pentane.

EXAMPLE 5

To refluxing and stirred solution of 1 g. of 2-methoxymethylene-17β-acetoxy-5α-androstan-3-one in 8 ml. of dimethyl diethyleneglycol ether is added over a 1.5 hour period in a dropwise fashion, a solution of 20 molar equivalents of sodium chlorodifluoroacetate in 25 ml. of dimethyl diethyleneglycol ether. The mixture is refluxed under nitrogen until the reaction is substantially complete, as determined by observation of the U.V. spectra, and then filtered. The filtrate is evaporated in vacuo to a residue containing a mixture of 5α-androstan-17β-acetoxy-[2,3-d]-2′,2′-difluoro-3′α-methoxy-2′,3′-dihydrofuran and 5α-androstan-17β-acetoxy-[2,3-d]-2′,2′-difluoro-3′β-methoxy-2′,3′-dihydrofuran which can be further purified by recrystallization from acetone:hexane to be employed as a mixture of isomers or separated by chromatography and recrystallization as described in Example 1.

What is claimed is:

1. A compound selected from the group consisting of:

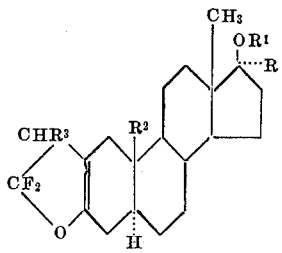

and

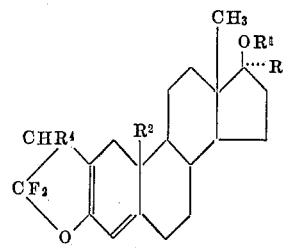

wherein R is selected from the group consisting of hydrogen, lower alkyl, lower alkenyl and lower alkynyl, R¹ is selected from the group consisting of hydrogen, a carboxylic acyl group of less than 12 carbon atoms, tetrahydrofuran-2-yl and tetrahydropyran-2-yl, R² is selected from the group consisting of hydrogen and methyl, R³ is selected from the group consisting of lower alkoxy and a carboxylic acyloxy group of less than 12 carbon atoms, and R⁴ is selected from the group consisting of hydrogen, lower alkoxy and a carboxylic acyloxy group of less than 12 carbon atoms.

2. A compound according to claim 1 of the formula

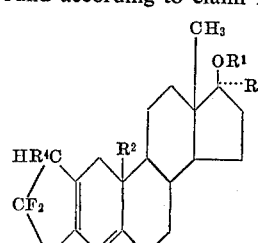

wherein R, R¹, R² and R³ are as defined therein.

3. A compound according to claim 2 wherein R and R¹ are each hydrogen and R³ is methoxy.

4. A compound according to claim 2 wherein R and R¹ are each hydrogen and R³ is acetoxy.

5. A compound according to claim 2 wherein R¹ is hydrogen, R and R² are each methyl and R³ is methoxy.

6. A compound according to claim 2 wherein R is methyl, R¹ and R² are each hydrogen and R³ is methoxy.

7. A compound according to claim 2 wherein R is ethynyl, R1 is hydrogen, R² is methyl and R³ is methoxy.

8. A compound according to claim 2 wherein R is ethynyl, R1 is hydrogen, R² is hydrogen and R³ is methoxy.

9. A compound according to claim 2 wherein R is ethynyl and R³ is lower alkoxy.

10. A compound according to claim 2 wherein R is lower alkyl and R³ is lower alkoxy.

11. A compound according to claim 2 wherein R³ is acetoxy.

12. A compound according to claim 1 of the formula

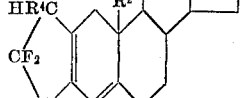

wherein R, R¹, R² and R⁴ are as defined therein.

13. A compound according to claim 12 wherein R is ethynyl, R¹ and R² are each hydrogen and R⁴ is methoxy.

14. A compound according to claim 12 wherein R is methyl, R¹ and R² are each hydrogen and R⁴ is methoxy.

15. A compound according to claim 12 wherein R is ethyl, R¹ and R² are each hydrogen and R⁴ is methoxy.

16. A compound according to claim 12 wherein R, R¹ and R² are each hydrogen and R⁴ is methoxy.

17. A compound according to claim 12 wherein R is ethynyl, $R^1$ is hydrogen, $R^2$ is methyl and $R^4$ is methoxy.

18. A compound according to claim 12 wherein R is methyl, $R^1$ is hydrogen, $R^2$ is methyl and $R^4$ is methoxy.

19. A compound according to claim 12 wherein R is ethyl, $R^1$ is hydrogen, $R^2$ is methyl and $R^4$ is methoxy.

20. A compound according to claim 12 wherein R and $R^1$ are each hydrogen, $R^2$ is methyl and $R^4$ is methyl and $R^4$ is methoxy.

21. A compound according to claim 12 wherein $R^4$ is hydrogen.

22. A compound according to claim 12 wherein $R^4$ is acetoxy.

23. A compound according to claim 12 wherein $R^4$ is lower alkoxy.

References Cited

UNITED STATES PATENTS

| | | | |
|---|---|---|---|
| 3,079,406 | 2/1963 | Knox | 260—239.55 |
| 3,148,186 | 9/1964 | Orr | 260—239.55 |
| 3,377,343 | 4/1968 | Fried | 260—239.55 |

LEWIS GOTTS, *Primary Examiner.*

E. G. LOVE, *Assistant Examiner.*

U.S. Cl. X.R.

167—74

UNITED STATES PATENT OFFICE
CERTIFICATE OF CORRECTION

Patent No. 3,415,820                                  December 10, 1968

John H. Fried

It is certified that error appears in the above identified patent and that said Letters Patent are hereby corrected as shown below:

Column 1, lines 50 and 58, "alkenyl", each occurrence, should read -- alkynyl --; line 59, "ethenyl" should read -- ethynyl --. Column 3, line 64, after "17β-" insert -- hydroxy --. Column 5, lines 65 to 75, and column 6, lines 25 to 35, the formula, each occurrence, should appear as shown below:

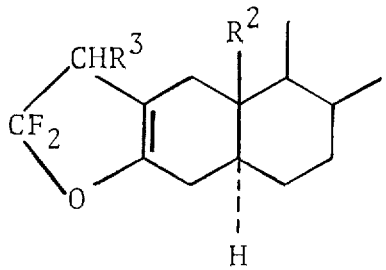

Column 6, lines 1 to 13, the formula should appear as shown below:

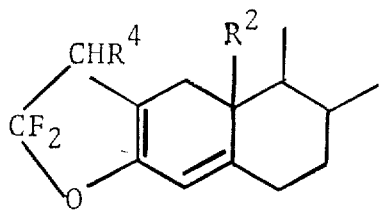

Column 6, lines 45 and 47, "R1", each occurrence, should read -- $R^1$ --. Column 7, line 8, cancel "and $R^4$ is methyl".

Signed and sealed this 17th day of March 1970.

(SEAL)
Attest:

EDWARD M. FLETCHER, JR.                    WILLIAM E. SCHUYLER, JR.
Attesting Officer                              Commissioner of Patents